United States Patent
Krikellas et al.

(10) Patent No.: US 8,713,359 B1
(45) Date of Patent: Apr. 29, 2014

(54) AUTONOMOUS PRIMARY-MIRROR SYNCHRONIZED RESET

(75) Inventors: Konstantinos Krikellas, San Mateo, CA (US); Florian Michael Waas, San Francisco, CA (US); Milena Bergant, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 215 days.

(21) Appl. No.: 13/250,327

(22) Filed: Sep. 30, 2011

(51) Int. Cl.
*G06F 11/00* (2006.01)

(52) U.S. Cl.
USPC ............ 714/6.23; 714/6.22; 714/6.1; 714/6.2

(58) Field of Classification Search
USPC .............. 714/6.11, 6.22, 6.23, 6.3, 2, 6.1, 6.2
See application file for complete search history.

(56) References Cited

U.S. PATENT DOCUMENTS

| | | | |
|---|---|---|---|
| 6,772,303 B2 * | 8/2004 | Crockett et al. | 711/162 |
| 7,383,407 B1 * | 6/2008 | Kiselev | 711/162 |
| 8,074,107 B2 * | 12/2011 | Sivasubramanian et al. | 714/6.3 |

\* cited by examiner

*Primary Examiner* — Sarai Butler
(74) *Attorney, Agent, or Firm* — Barry N. Young

(57) ABSTRACT

Server supervisor processes in the segment nodes of a database cluster afford transparent reset mechanisms to a fault tolerant service (FTS). FTS probes only primary segments as to their status unless a primary segment does not respond, in which case FTS will probe the mirror of that primary-mirror pair, and change the state of the mirror to primary if the primary is faulty. Only a primary segment to initiate a reset of its mirror segment and then resets itself. If a mirror segment fails, it shuts down and its corresponding primary segment will report the failure to FTS. Transient communication failures are addressed by retry logic on FTS probing, and not reported to FTS. Reset is not initiated by FTS and preserves the segment state in the absence of errors.

17 Claims, 5 Drawing Sheets

AUTONOMOUS PRIMARY-MIRROR SYNCHRONIZED RESET

BACKGROUND

This invention relates generally to fault management in distributed database systems, and more particularly to management of resets in mirrored database segments.

In distributed database systems, data is replicated (mirrored) to sets of different nodes having different database segments for fault tolerance reasons. This requires at least two replicated segments, one is a primary segment and one is a mirror segment. If the primary segment becomes unusable, a mirrored segment can be promoted to be primary to keep the system online. A fault tolerance service (FTS) maintains health information for each segment, and uses the information to decide whether a mirror should be promoted to primary. FTS can be centralized to run on a master node or distributed to two or more segment nodes using a consensus protocol. FTS periodically checks the health of each primary and mirror in a primary-mirror pair by probing the nodes. If one segment has a problem and the segments are synchronized, FTS transitions the healthy segment to become primary and to enter a low-availability mode, while the faulty segment is marked as mirror and unavailable. For the period that the mirror is unavailable, the primary keeps track of any updates to the stored data. If a failed mirror is recovered, it is re-synchronized by receiving and applying the pending updates from the primary. Until re-synchronization completes, the data stored in the mirror are not consistent with the data on the primary so the mirror cannot be used for failover.

Each pair of primary and mirror segments is synchronized using a replication protocol. Since the primary and mirror are physically located on different machines, they monitor the states of their communications and replication infrastructure, and report to FTS when probed. For example, if a mirror encounters a failure while trying to receive data from its primary, it will report this event to FTS. If FTS determines that the primary is offline, it promotes the mirror to primary.

Certain software failures may be severe enough to require resetting a single component (e.g., a process) of the database system, a group of processes, or even the operating system by restarting the server machine, and distributed database systems have such reset mechanisms. For instance, if a process crashes while holding a lock, the lock is never released so that one or more processes will likely deadlock waiting for this lock. Also, a process that detects corruption in shared memory, e.g., due to hardware failures or software bugs, must prevent other processes from transferring corrupted data to the disk and overwriting healthy data. It is, therefore, important that the system have a mechanism to reset, i.e. immediately stop all running server processes and threads, re-initialize shared memory, and restart all required processes. Any server application has such a reset mechanism. For instance, distributed database systems that are built on PostgreSQL have a reset mechanism known as "postmaster reset" for this purpose.

Because replication is a "stateful" protocol (the primary and mirror keep track of their ability to communicate and replicate data), if one node detects a replication problem, it may report it to FTS and request action be taken to keep the system operating. On a primary or mirror reset, replication processes are restarted so the replication framework may need to be reset. A reset stops all processes, and cleans and re-initializes shared memory that stores information about the current replication state.

When a reset occurs, communication between a primary and its mirror is interrupted, necessitating system reconfiguration. For example, if a primary resets, it will break and reinitialize communication with its mirror, and may fail to respond to a health check from FTS, causing the mirror or FTS to assume that the primary is faulty. The result of this is that primary will be marked as offline, and the system will no longer be fault tolerant. On current distributed databases, both the primary and the mirror can initiate a reset if one detects an event that requires reset.

Since there are three different remote nodes (master, primary and mirror) that can interact, the timing of occurrence and duration of events can create problems. For example, if a mirror detects a replication fault before it receives a reset request from the primary, it may erroneously report to the FTS on the master node that the primary is faulty, causing the FTS to designate the primary as being faulty. Additionally, if a reset stops a running process on a segment before it completes responding to an FTS probe, FTS may assume the segment is faulty and transition it to a different state, causing disruption of replication and possibly system reconfiguration. Furthermore, the mirror will be promoted to primary and caused to enter a low availability mode. Any currently executing operation (query) will be either suspended or cancelled since its execution requires coordination with the new primary. The system will remain offline and unavailable until either the replication mechanism between the primary and mirror is re-established or the mirror is transitioned to primary in low availability mode.

Established reset mechanisms have significant undesirable consequences and are accompanied by a number of other problems, some of which have been mentioned. Reestablishing communications and reconfiguring the system are heavyweight, time-consuming processes. What are needed are reset mechanisms that execute autonomously between a primary and mirror without external coordination, are transparent to FTS to simplify the fault detection logic, and minimize down time and disruption of user experience.

It is desirable to provide new and improved reset systems and methods that address the foregoing and other problems of known reset approaches, and it is to these ends that the present invention is directed.

DESCRIPTION OF PREFERRED EMBODIMENTS

The invention is particularly well adapted for use with a shared nothing distributed database architecture, and will be described in that context. However, as will be appreciated, this is illustrative of only one utility of the invention.

Figure 1:
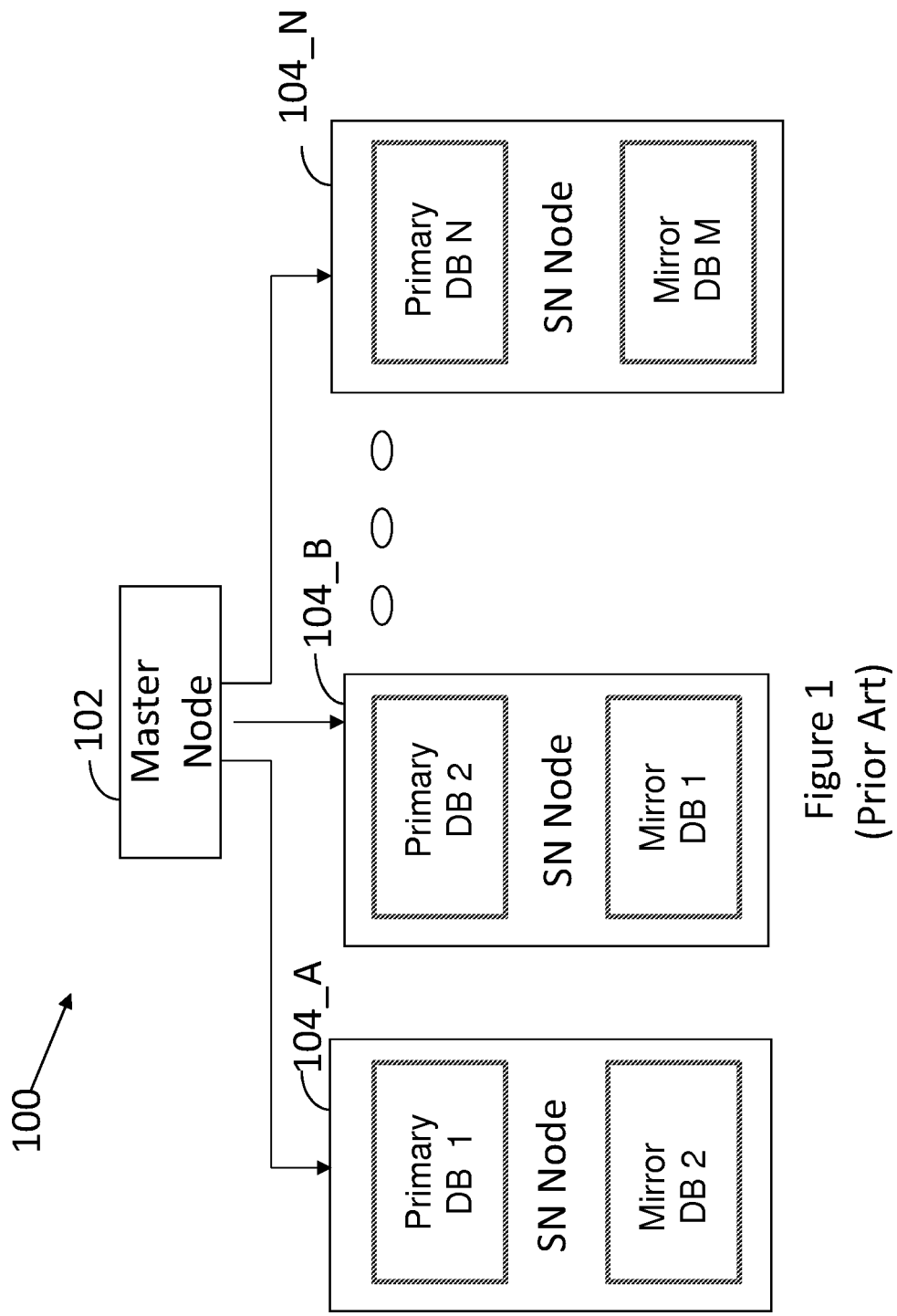
FIG. 1 illustrates the architecture of a shared-nothing distributed database system of the type with which the invention may be employed.

FIG. 1 illustrates a shared-nothing network architecture of a logical database cluster 100 with which the invention may be employed. The cluster may include a master node 102 which connects to a plurality of shared-nothing nodes 104-A through 104-N. Each node may comprise a plurality of database (DB) segments (database instances) including one or more primary databases and one or more mirror databases. As indicated in the figure, for fault tolerance purposes, a primary database segment and its corresponding peer mirror database segment are located on different nodes. Node 104-A may contain, for example, Primary DB 1 and Mirror DB 2, whereas node 104-B may contain Primary DB 2 and Mirror DB 1. Thus, mirroring Primary DB 1 on node 104-A requires that primary data be written (replicated) to Mirror DB 1 on node 104-B. The master and segment nodes may be server applications having the same process model as a standalone server and augmented with extensions for a distributed system, such as data distribution, remote process communications, and data replication between primary-mirror pairs.

Figure 2:
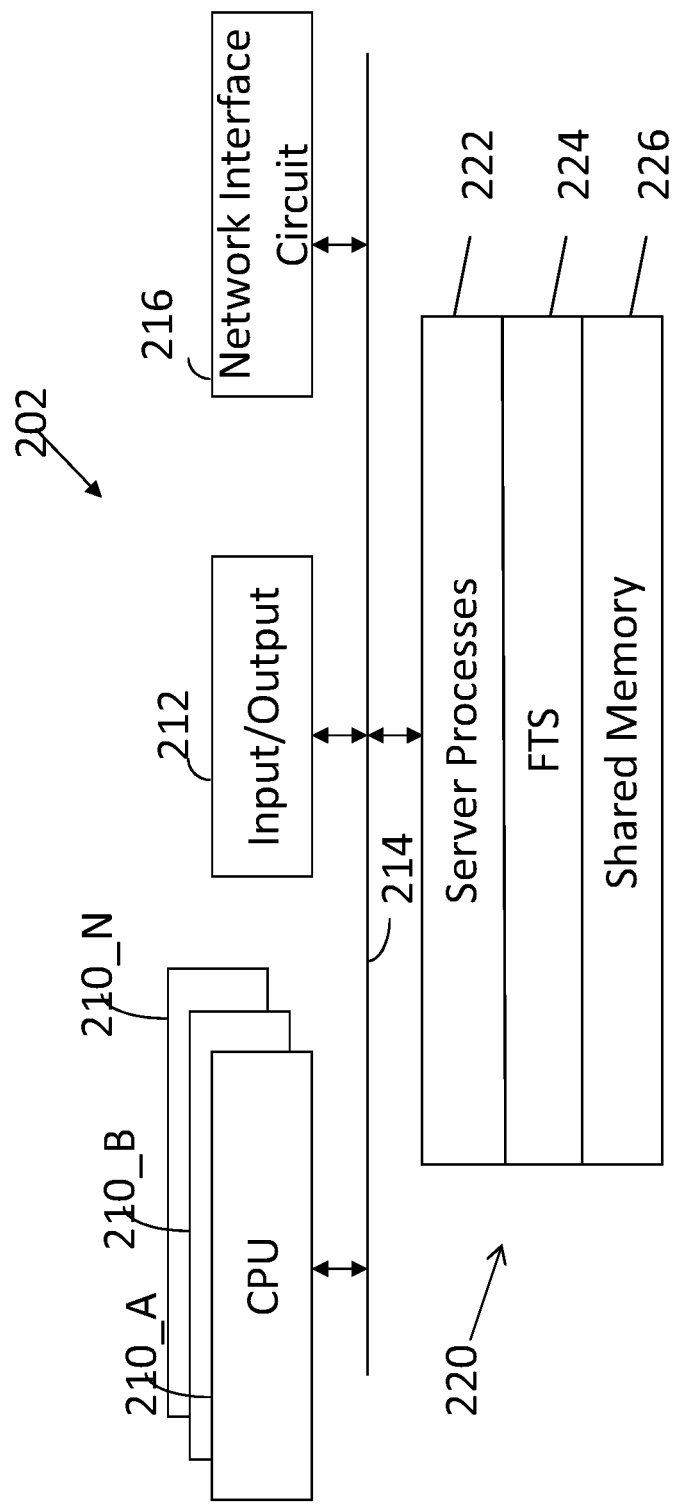
FIG. 2 is a block diagram of a master node of the system of FIG. 1.

FIG. 2 illustrates a master node 202 of the database cluster of FIG. 1 that is configured to implement operations in accordance with the invention. The master node may comprise a multi-processor server comprising a plurality of CPUs 210-A through 210-N connected to input/output (I/O) devices 212 by a bus 214. Alternatively, the node may employ a single processor server system; in both cases, the operating system provides mechanisms for parallel execution through process and thread management. The I/O devices may be standard computer system input and output devices. A network interface circuit 216 may also be connected to bus 214 to allow the master node to operate in a networked environment. The master node may also have a memory 220 connected to the bus that comprises non-transitory computer readable media that embodies executable instructions to control the operation of the server to perform processes in accordance with the invention. Included in memory 220 may be server processes 222 that include a supervisor processing thread (in the form of an operating system process, or a kernel- or user-space thread) that is responsible for forking (starting) and monitoring the health of all other server processing threads. Included in the server supervisor processing thread is a mechanism in accordance with the invention that manages reset, as will be described. Memory 220 may also include a fault tolerance service process (FTS) 224, and a shared memory 226 for communications with clients or remote processes. The FTS process 224 also may be centralized on the master node or FTS may run on all nodes using a consensus protocol. As will be described, FTS in accordance with the invention is responsible for periodically probing each primary of a primary-mirror pair to determine when there is a problem, and for transitioning the pair to a new state.

Figure 3:
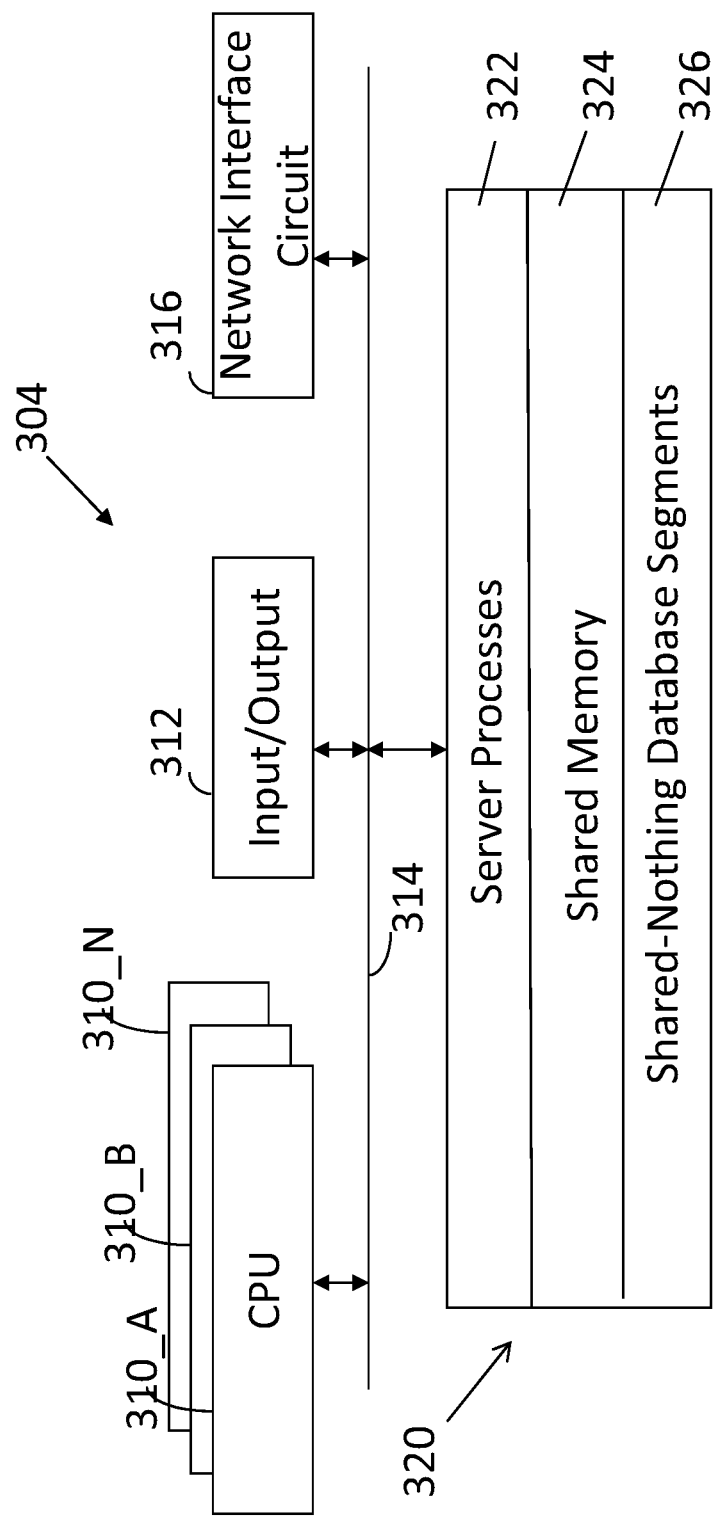
FIG. 3 is a block diagram of a segment node of the system of FIG. 1.

FIG. 3 illustrates a shared-nothing segment node 304 configured to implement operations in accordance with the invention. Node 304 may have a similar architecture to master node 202, comprising a multi-processor server having a plurality of CPUs 310-A through 310-N, a set of input/output devices 312, and a network interface circuit 316 to afford network connectivity connected to a bus 314. The segment node may also comprise a memory 320 comprising computer readable media for storing executable instructions for controlling the operation of the CPUs may also be connected to the bus. Memory 320 may comprise server processes 322 containing data and executable instructions to implement the processes of the invention, including a server supervisor process similar to that on the master, shared memory 324 for communications with clients or other processes, and may include one or more shared-nothing database segments 326. The database segments 326 may comprise primary and mirror database instances.

The invention affords modified reset mechanisms and FTS processes (that may be extensions to the normal server processes) that address the known problems of reset, and that afford improved management of primary and mirror reset and FTS fault tolerant processes. In accordance with the invention, the principal responsibility for monitoring the health of a primary-mirror pair is given to the primary. Only the primary can trigger a reset upon detection of an event that requires resetting, such as a process terminating unexpectedly or a sub-process explicitly requesting reset. Furthermore, an FTS process in accordance with the invention probes only the primary. FTS does not probe the mirror unless the primary is non-responsive. If the server supervisor process on the mirror detects an event that requires reset, it shuts the mirror down instead of resetting it. The mirror does not participate in data processing, but only runs the replication mechanism to write data to update its disk so mirror reset incidents are very rare. If a failure occurs in the replication process on the mirror, or the mirror supervisor process detects a reset request and shuts down the server, the replication process on the primary will detect the failure and report it to FTS as a replication fault. If the primary triggers a reset that proceeds without error, it will report no failure so that FTS will take no action. Since mirror resetting is disabled, a primary will never falsely report a replication fault because it lost communication with a resetting mirror. Segment probing is faster since FTS needs to probe only the primary segments in the cluster. The mirror segments can be ignored as long as the primaries are online and report no fault.

The FTS process incorporates retry logic. If a segment does not respond within a given timeout period, or if there is a communication error, FTS may resend the probe request to the segment and only after a predetermined number of tries identify the segment as faulty. If a reset kills a process that handles the probe request on a segment thus breaking communication with FTS on the master, FTS will send a new state request instead of immediately marking the segment as faulty. If the segment does not respond to the FTS probe request timely, FTS may transition the segments to a low availability state. Transient communication failures between a primary and mirror are also addressed by the retry logic of FTS. Accordingly a transient communication failure between a resetting primary and mirror are not reported to FTS. Subsequently, a primary reset does not bring about any segment state transition.

Furthermore, in accordance with the invention each segment may maintain the latest transition request in its shared memory. During reset, the shared memory information is transferred to local statically allocated memory for the reset process before the shared memory is reset. Subsequently, following reset this information may be restored to shared memory. After shared memory is reset, a transition request can be recorded in the shared memory so that the segment will be able to transition to the latest valid state. Moreover, each segment maintains information about replication faults in its local memory during a reset that can be reported to FTS subsequently upon conclusion of the reset process. If a primary segment fails to reset its mirror on a reset, it records this as a replication failure. FTS will mark the mirror as failed and transition the primary to a low availability mode.

Figure 4:
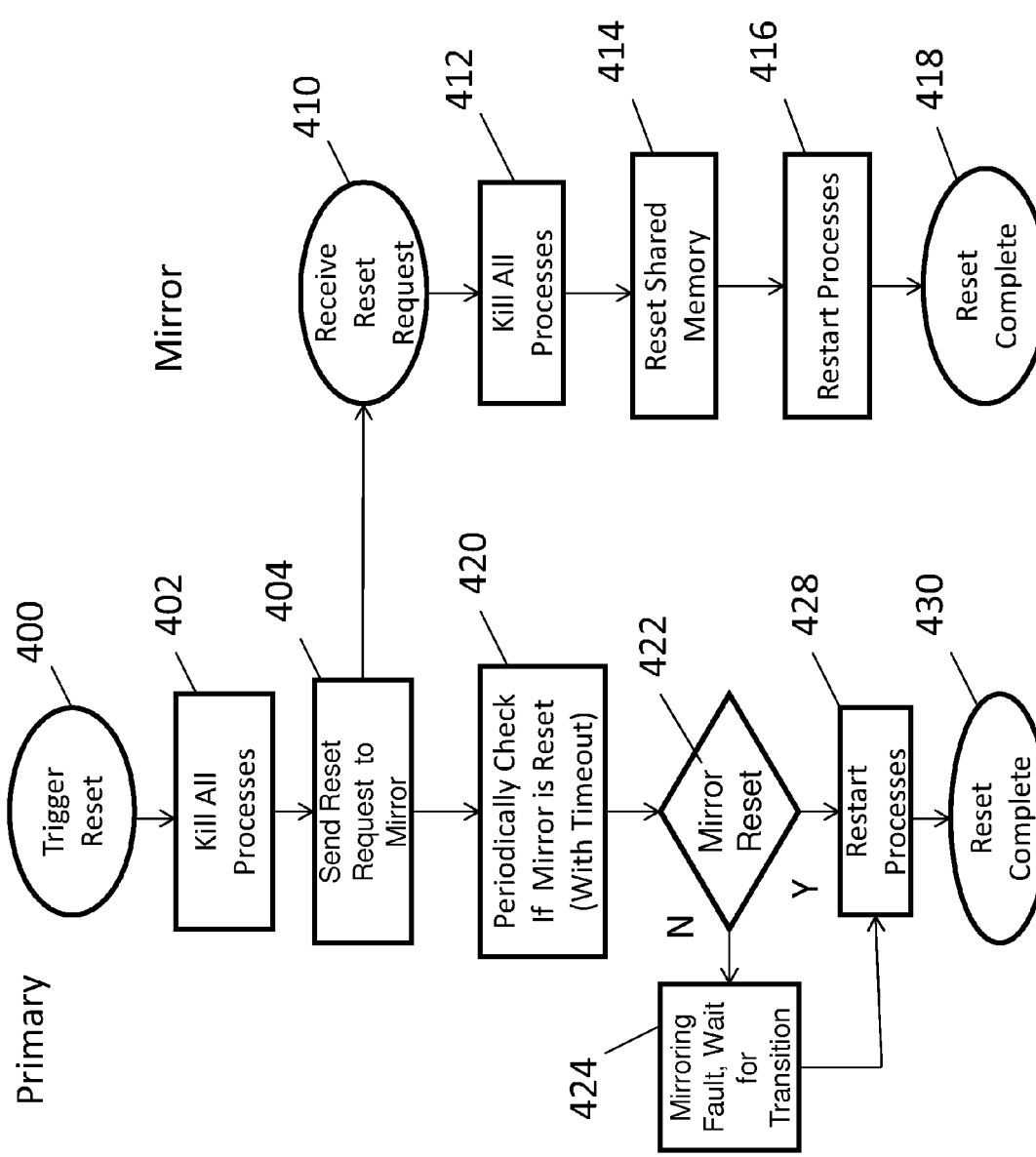
FIG. 4 is a flowchart of a reset process in accordance with the invention.

FIG. 4 illustrates server supervisor processes on a primary-mirror pair embodying a reset mechanism in accordance with the invention. Upon the primary receiving a trigger to reset at 400, the supervisory reset process kills, i.e., stops, all primary processes at 402, and sends a reset request to the mirror at 404. The mirror receives the reset request at 410, stops all mirror processes at 412, resets shared memory to a local state at 414, and restarts all processes at 416 to complete the reset process on the mirror at 418. The server supervisory process on the primary waits at 420 for a response from the mirror, and decides at 422 whether the mirror has been reset. If after a predetermined timeout, the supervisory reset process on the primary does not receive a response from the mirror, the process makes a decision at 422 that there is a replication fault, and this is reported to FTS at 424. Upon successful mirror reset completion, the reset process on the primary restarts all processes and restores communications with the mirror at 428 to complete the reset process at 430. If, on the other hand, the mirror segment fails to reset, the primary reports this to FTS (upon FTS probing the primary) upon completion of reset. FTS may then decide to transition the primary-mirror pair to a different state, such as low availability.

A segment may register any failure that occurs during the reset process. This information is transferred to local memory during reset and restored to shared memory after a reset completes. When the node reports a failure to FTS, it decides whether to transition to another state. If the master node sends a state transition request to a primary-mirror pair while the pair is being reset, the transition request is registered in local memory while shared memory is cleaned up and applied after reset completes.

As noted above, none of the segments reports directly to FTS, but only responds to FTS when probed, and FTS does not normally probe the mirror segments. Thus, if the primary goes down and the mirror loses communications with the primary, it does not report this directly to FTS. Rather, upon FTS being unable to communicate with the primary, will then probe the mirror to request its state. The mirror may report back that it is healthy but that it has a problem with the primary. FTS may then transition the mirror to become primary and to enter the low availability state. Segments cannot change states on their own. FTS is the only entity in the system that can change states.

Figure 5:
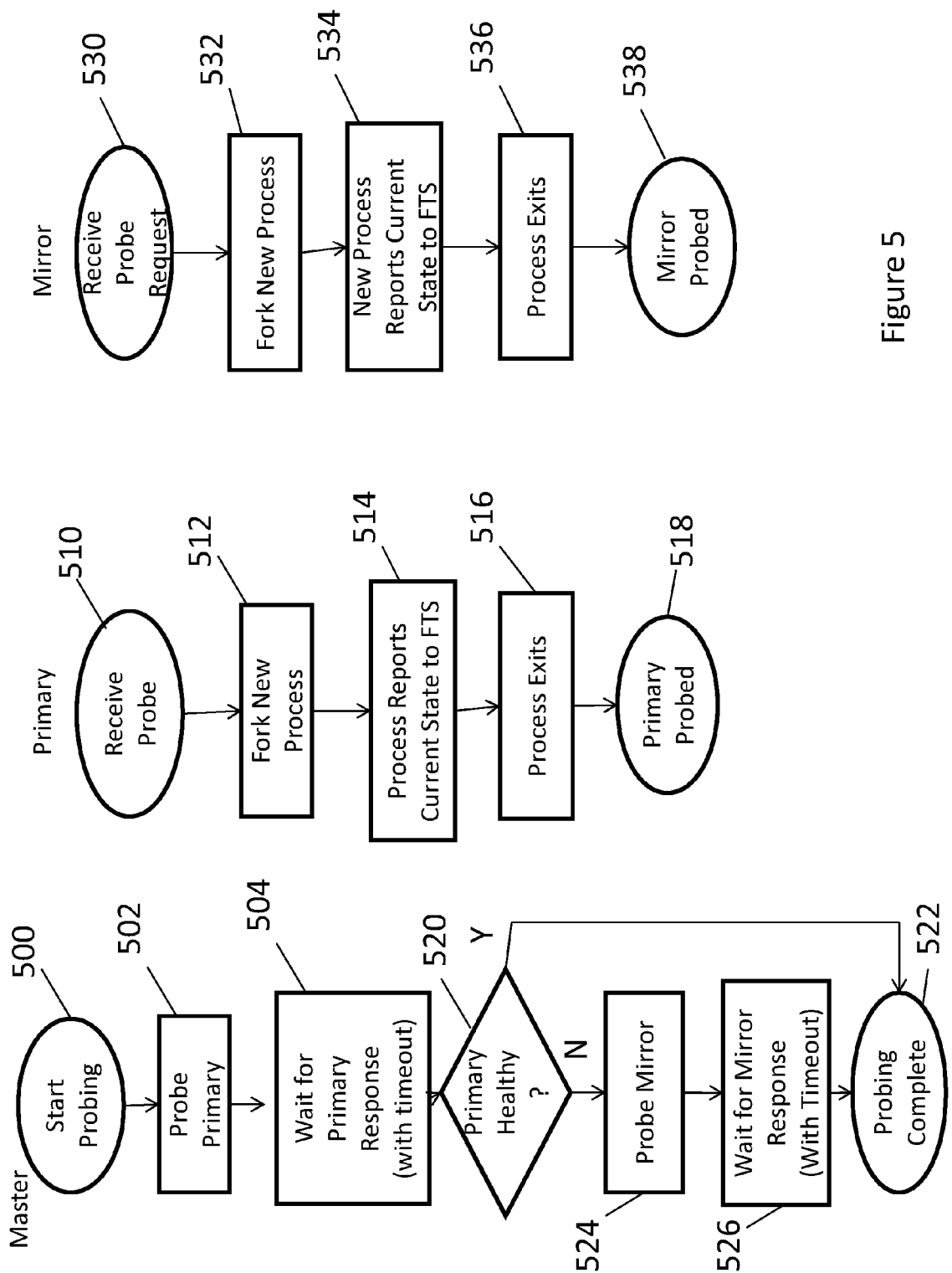
FIG. 5 is a flowchart that illustrates FTS probing in accordance with the invention.

FIG. 5 illustrates a FTS probing mechanism in accordance with the invention. Upon the master starting probing at 500, it sends a probe message at 502 to a primary, and waits at 504 for a response from the primary. If the primary is healthy, it receives the probe from the master at 510, forks (starts) a new process at 512 to handle the probe, retrieves its current state and reports back to FTS on the master at 514. The probe handling process on the primary that was forked at 512 then exits at 516 to complete the probe at 518.

On the master, FTS determines at 520 whether the primary is healthy based upon the report from the primary at 504 or the lack of report after a timeout. If FTS determines that the primary is healthy, probing is completed at 522. If, however, FTS determines at 520 that the primary is not healthy because it receives no response to the probe, FTS will next determine the state of the mirror. FTS will send a probe message to the mirror at 524, and wait for a response from the mirror at 526. The mirror, upon receiving the probe request from the master at 530, will fork a new process at 532 to handle the probe, and report back its current state and its problem communicating with the primary at 534. After reporting, at 536 the process handling the probe on the mirror exits to end the probing process at 538. Based upon the results of probing, FTS can take appropriate action, such as changing states or forcing a reset of the nodes.

As can be seen from the foregoing, the invention affords simple yet robust solutions to the problems of known reset and fault management service approaches. A reset mechanism in accordance with the invention resets the mirror when the primary identifies possible corruptions in shared memory, and then resets the primary. This prevents propagation of corrupted data from the primary to the mirror. An FTS in accordance with the invention is faster and more efficient than conventional fault tolerant services since it does not probe mirror segments unless there is a problem with a primary segment. Thus, the server reset mechanism of the invention minimizes downtime of the primary and mirror database segments, is faster, more efficient, and less costly than known reset approaches. Reset is also transparent to the master. Therefore, it is less error-prone and timing sensitive. Finally, from a user standpoint, the reset mechanism affords a user experience that is similar to that of a centralized database system.

While the foregoing description has been with reference to particular embodiments of the invention, it will be appreciated that changes to these embodiments can be made without departing from the principles and the spirit of the invention, the scope of which is defined by the appended claims.

The invention claimed is:

1. A method of resetting primary and mirror segments on segment nodes of a distributed database, comprising supervisor processes on the nodes for:
   detecting an event that requires a reset;
   sending exclusively by a primary segment of a primary-mirror pair of segments a reset request to the mirror segment of said pair upon said detecting of said event; and
   the mirror segment initiating a reset of itself solely in response to said reset request and informing the primary segment upon completing reset.

2. The method of claim 1 further comprising the mirror segment, upon initiating reset, stopping all mirror segment processes and resetting shared memory.

3. The method of claim 1 further comprising the primary segment stopping primary segment processes upon sending said reset request to the mirror segment, and restarting said primary segment processes upon the mirror segment completing reset.

4. The method of claim 3 further comprising the primary segment resetting itself upon the mirror segment completing said reset or upon said primary-mirror pair transitioning to a different state.

5. The method of claim 1, wherein said distributed database further comprises a fault tolerant service process that probes the primary segments of said database and transitions a primary-mirror pair to a different state upon detection of a fault, and the method further comprises controlling said fault tolerant service process to probe only primary segments unless a primary segment fails to respond to a probe, and then to probe a mirror segment of the primary-mirror pair that includes said primary segment that fails to respond to the probe.

6. The method of claim 5, wherein said fault tolerant service process, upon detecting said fault on the primary, transitions the mirror segment of said pair to become a primary segment and to enter a low availability mode.

7. Computer readable non-transitory storage medium for storing instructions for controlling supervisory processes of computers on primary and mirror segment nodes of a database to reset segments, comprising instructions for:
   detecting an event that requires a reset;
   sending exclusively by a primary segment of a primary-mirror pair of segments a reset request to the mirror segment of said pair upon said detecting of said event; and the mirror segment initiating a reset of itself solely in response to said reset request and informing the primary segment upon completing reset.

8. Computer readable instructions according to claim 7 further comprising instructions for stopping all mirror segment processes and resetting shared memory upon initiation of said reset.

9. Computer readable instructions according to claim 7 further comprising instructions for the primary segment stopping primary segment processes upon sending said reset request to the mirror segment, and restarting said primary segment processes upon the mirror segment completing reset or upon the primary and mirror segments transitioning to a different state.

10. Computer readable instructions according to claim 9 further comprising instructions for the primary segment resetting itself upon the mirror segment completing said reset or upon said transitioning to a different state.

11. Computer readable instructions according to claim 7, wherein said distributed database further comprises a fault tolerant service process that probes the primary segments of said database and transitions a primary-mirror pair to a different state upon detection of a fault, and wherein said instructions further comprise instructions for controlling said fault tolerant service process to probe only primary segments unless a primary segment fails to respond to a probe, and then to probe a mirror segment of the primary-mirror pair that includes said primary segment that fails to respond to the probe.

12. Computer readable instructions according to claim 7 further comprising instructions for transferring any information received by a segment during reset to local memory, and transferring said information to shared memory upon completion of reset.

13. A method of handling faults on a replicated primary-mirror pair of primary and mirror segments of a distributed database, the method comprising:
  detecting by the primary segment of said primary-mirror pair a reset event;
  upon detecting said reset event, stopping all primary processes on said primary segment and sending exclusively by said primary segment a reset request to the mirror segment;
  checking by the primary segment whether the mirror segment was reset in response to said reset request; and
  upon determining by the primary segment that the mirror segment was reset, restarting said primary processes, otherwise notifying a fault tolerant service of said distributed database of a fault.

14. The method of claim 13 further comprising resetting said primary segment upon said mirror segment being reset.

15. The method of claim 14 further comprising transferring information about a failure that occurs during reset to local memory, and restoring the information to shared memory upon completion of reset.

16. The method of claim 13 further comprising probing a mirror segment of said primary-mirror pair upon the primary segment of such pair failing to respond to said probing of said primary segment.

17. The method of claim 13 further comprising probing said primary and mirror segments by said fault tolerant service upon being notified of said fault; forking new processes on said primary and mirror segments; and reporting state information on said primary and mirror segments back to the fault tolerant service.

\* \* \* \* \*